July 21, 1964 D. BISER 3,141,960
DECADE COUNTER WITH ANALOG DISPLAY FOR USE WITH
AIRBORNE VEHICLE NAVIGATION MEANS
Filed Nov. 3, 1961
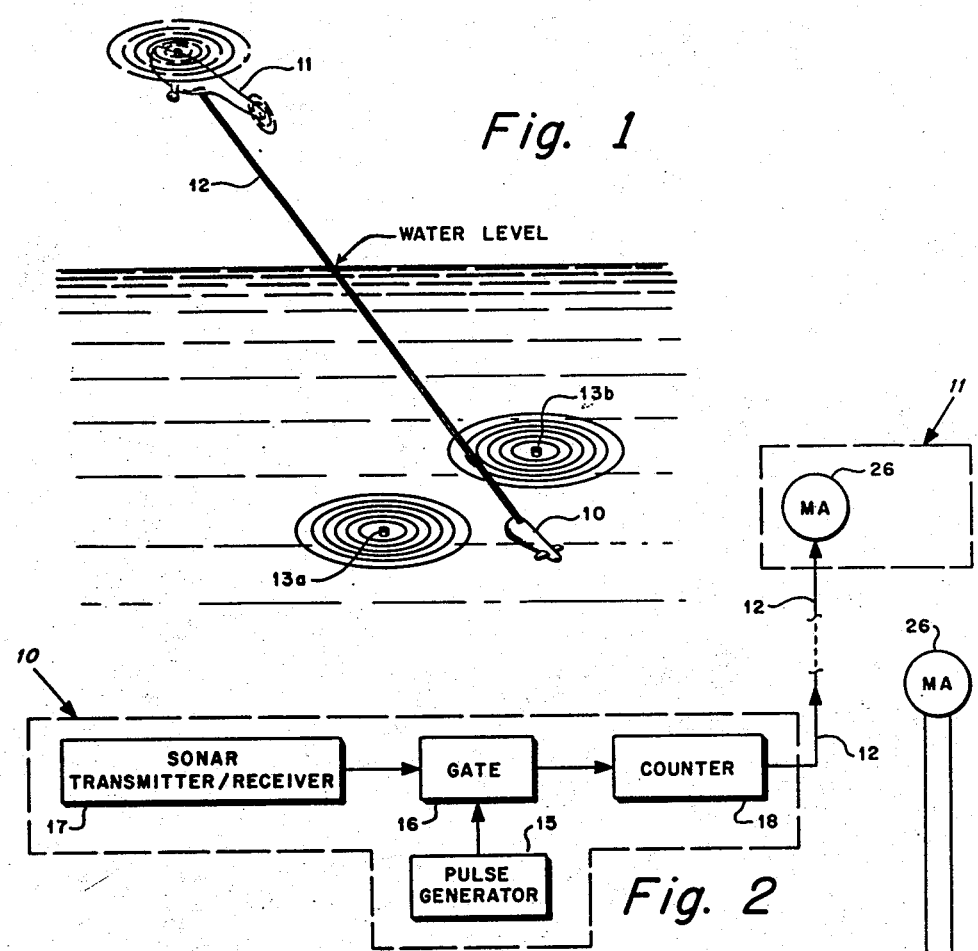
Fig. 1
Fig. 2
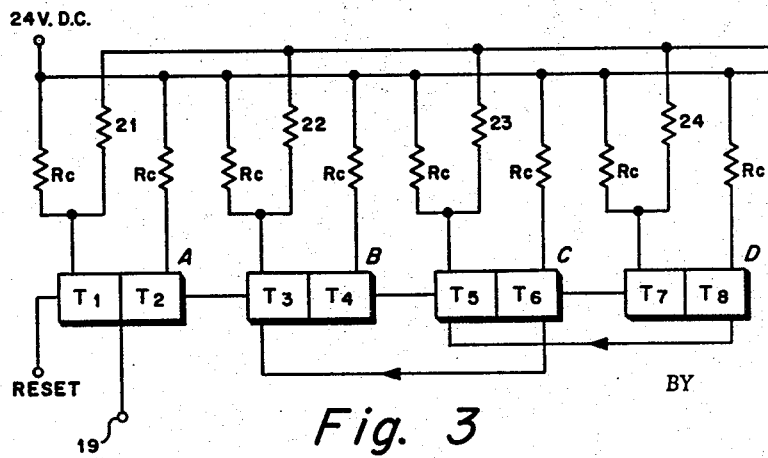
Fig. 3
INVENTOR.
DAVID BISER
BY
ATTORNEY United States Patent Office 3,141,960
Patented July 21, 1964

3,141,960
DECADE COUNTER WITH ANALOG DISPLAY FOR USE WITH AIRBORNE VEHICLE NAVIGATION MEANS
David Biser, Philadelphia, Pa., assignor to the United States of America as represented by the Secretary of the Navy
Filed Nov. 3, 1961, Ser. No. 150,104
1 Claim. (Cl. 235—92)
(Granted under Title 35, U.S. Code (1952), sec. 266)

The invention described herein may be manufactured and used by or for the Government of the United States of America for governmental purposes without the payment of any royalties thereon or therefor.

The present invention relates to a counter and more particularly to a decade counter having an analog output.

The present invention contemplates a decade counter wherein four binary elements having the basic form of Eccles-Jordan trigger circuit are cascaded in series and have appropriate feedback means to provide recycling after ten input pulses. Each binary is provided with a metering resistor the resistance of which is weighted so that the current going through a current meter in circuit therewith is directly proportional to the number of pulses inserted into the counter.

Although the counter of the present invention has general utility, it was designed specifically for use in an underwater ranging system of the type disclosed in application Serial No. 106,418, filed April 26, 1961, and is an improvement over the counter used in that system and which is more fully described in application Serial No. 856,625, filed December 1, 1959.

The invention is adapted for use in an underwater acoustic navigation system where the principal method of position locating employs a range computer for determining the distance of an unknown point from two known points. In this method an interrogator located at the unknown point sends out acoustical pulses which on receipt by responders located at the two known points cause the responders each to transmit a signal back to the interrogator. By determination of the ranges or distances of the unknown point from each of the responders, the position of the interrogator is fixed in relation to the responders. By continually transmitting and receiving pulses the course of the interrogator may be plotted. The interrogator may be carried in a submarine or other submerged body suspended by means of a cable from a helicopter.

The principal method employed in these systems for determining range or distance from a responder to the interrogator is to count the number of pulses from a constant frequency signal source which occur during the time it takes a pulse to transmit and cause a pulse to be returned to the interrogator via the responder. The present invention is concerned with a counter for accomplishing the above-mentioned purpose.

Present day counters and the one used in the system disclosed in application Serial No. 106,418 utilize conventional tube type decade counters commonly referred to as beam switching tubes. In the environment in which the counter of this invention is expected to be used, that is, enclosed in a bottom contour following body submerged in the sea and suspended by a cable from a helicopter the use of conventional tube type decade counters entails many disadvantages.

Since the tube type decade counters require substantially more power to operate than is generally available from the power supply normally found in a helicopter, a separate source of power is required. Also, due to the high power required and the necessary compactness of the range computing system which includes a counter, a heat dissipation problem results.

The present invention further contemplates a decade counter having a D.-C. output which is readily adaptable to be transmitted through conducting means in the suspending cable of the helicopter. Thus, since all elements except the indicating meter are adapted to be carried in the bottom contour following body or fish below the surface of the water, all intelligence is transmitted by way of the cable in the form of D.C. current.

An object of the present invention is to provide a decade counter having an analog output.

Another object of the present invention is the provision of a decade counter which is capable of receiving pulses to be counted directly and which comprises a cascaded binary system to supply an analog output which may be remotely indicated.

A further object of the present invention is to provide a binary counter of the decade type which provides directly as an output a current which is proportional to the number of pulses counted by the counter.

With these and other objects in view, as will hereinafter more fully appear, and which will be more particularly pointed out in the appended claim, reference is now made to the following description taken in connection with the accompanying drawings in which:

FIG. 1 is a diagram illustrating the environment in which the invention is intended to be used, FIG. 2 is a block diagram of the ranging system in which the invention is used, and FIG. 3 illustrates partly in block diagram form and partly in schematic form the preferred embodiment of this invention.

Referring now to FIG. 1 there is shown a helicopter 11 towing a bottom contour following body or fish 10 by means of a cable 12. The bottom contour following body or fish 10 contains a sonar transmitter-receiver and ranging equipment of which the counter of the present invention forms a part. The fish 10 besides being mechanically connected to the helicopter 11 by means of cable 12 is also electrically connected to helicopter 11 via conductors running through cable 12. Responders 13a and 13b on receiving an interrogator pulse from fish 10 transmits a pulse in all directions. When the pulse transmitted by responders 13a and 13b is received by the sonar receiver in fish 10, the actual time between transmission of a pulse from fish 10 and reception of the responder pulse is indicative of the distance from the fish 10 to the particular responder. By continuously determining the respective ranges from the fish 10 to responders 13a and 13b, not only the location of fish 10 with respect to the responders can be calculated but also the course of the fish 10 may be determined.

FIG. 2 of the present invention illustrates the ranging equipment contained in fish 10 which comprises the counter 18 of the present invention. The output from the counter 18 is directly connected via cable 12 to a milliammeter 26 carried in the helicopter.

FIG. 2 shows a conventional range computer for counting the clock pulses from pulse generator 15 which pass through a gate 16 which is opened for the length of time it takes an interrogator pulse from sonar transmitter-receiver 17 to transmit a pulse to activate a responder to transmit a pulse back to the sonar transmitter-receiver 17. Thus, the time that gate 16 is open is proportional to the distance from the fish 10 to a responder. Therefore, the number of pulses counted by counter 18 is proportional to the range.

Counter 18 which is the subject matter of the present invention, has been disclosed in its environment to more clearly set forth the conditions under which it was designed to operate.

Referring now to FIG. 3, the counter 18 comprises four binaries A, B, C, and D. Each binary is a transistorized form of the well-known Eccles-Jordan trigger circuit. The actual schematic configurations of the individual binaries form no part of the present invention and are not disclosed in detail.

As is well known, this circuit is characterized by two distinct stable states. Four binaries cascaded together as a counter normally require 16 input pulses before recycling.

In the present invention the odd numbered binary halves $T_1$, $T_3$, $T_5$, and $T_7$ are normally nonconducting while the even numbered halves $T_2$, $T_4$, $T_6$, and $T_8$ are normally conducting. The application of a trigger pulse at terminal 19 to binary A will cause $T_2$ to cut off and $T_1$ to turn on. Successive trigger pulses to binary A will alternately cause $T_1$ and $T_2$ to conduct. It can be seen that for every two input pulses one output pulse from binary half $T_2$ is coupled to the next binary half $T_3$. It takes eight pulses before binary D is flipped and eight more pulses before it is flipped back and automatic recycling occurs.

To convert the scale 16 to a decade or scale of 10 it is necessary to deliver six pseudo counts to the counter with every ten input pulses at terminal 19. This will permit the counter to recycle after ten pulses have been applied to terminal 19. This is effected by means of two feedback paths by which binary half $T_6$ is connected to binary half $T_3$ and binary half $T_8$ is connected to binary half $T_5$. Thus, for a single input pulse $T_1$ becomes conductive. When two pulses have been applied at terminal 19, $T_3$ becomes conductive. When three pulses have been applied at terminal 19, $T_1$ and $T_3$ are conductive. Four input pulses at terminal 19 cause $T_3$ and $T_5$ to be conductive. Five input pulses cause $T_1$, $T_3$ and $T_5$ to be conductive. Six input pulses cause $T_5$ and $T_7$ to be conductive. Seven input pulses cause $T_1$, $T_5$ and $T_7$ to be conductive. Eight input pulses cause $T_3$, $T_5$ and $T_7$ to be conductive. When nine pulses have been applied at terminal 19, $T_1$, $T_3$, $T_5$, and $T_7$ all become conductive. The tenth pulse applied to terminal 19 causes the counter to recycle and all of the odd numbered binary halves become nonconductive. On recycling of the counter binary half $T_8$ provides an output pulse which may be used as more fully pointed out hereinbelow.

The feedback path between $T_6$ and $T_3$ effectively causes $T_3$ to remain conductive when $T_5$ becomes conductive as a result of the fourth input pulse but without the feedback $T_5$ alone would be conductive. The same is true with regard to $T_5$ and $T_7$ in response to the sixth input pulse.

Thus, for any given number of one through nine input pulses a particular combination of conduction of binary halves $T_1$, $T_3$, $T_5$, and $T_7$ exists. It is by making use of this fact that the count inserted into the binary counter in digital form is converted into analog form in the output of the counter thereby making display of the count by a simple current measuring device feasible.

It is by utilizing the permutations of conduction or nonconduction of the odd numbered halves $T_1$, $T_3$, $T_5$, $T_7$ of each binary A, B, C, and D that the count is converted into analog form.

The exact manner in which the count is converted to an analog voltage form capable of display on a single D.C. instrument is as follows.

A weighted resistance 21, 22, 23, and 24 is connected to binary halves $T_1$, $T_3$, $T_5$, $T_7$, respectively, and each resistance 21, 22, 23 and 24 is connected to one side of milliammeter 26. The source of voltage is connected to the other side of milliammeter 26. Thus, when binary half $T_1$ is conductive, the source of voltage is connected through meter 26, resistance 21, and binary half $T_1$ to ground. Similarly, when any one of binary halves $T_1$, $T_3$, $T_5$, or $T_7$ is in the conductive state the voltage source is connected to ground through the meter 26, the conducting binary half, and the associated resistance. It can be seen for any combination of conduction of the binary halves $T_1$, $T_3$, $T_5$, and $T_7$, the voltage source is connected to ground through each of the binary halves and the associated resistance that happen to be in the conductive state.

By calibrating milliammeter 26 from 0–9 and weighting the resistances 21, 22, 23, and 24 relative to one another such that resistance 21=1, resistance 22=2, resistance 23=2, and resistance 24=4, milliammeter is provided with a current that is directly proportional to the number of pulses put into the counter at any given time.

Since for any given count there is a unique combination of conduction or nonconduction of binary halves $T_1$, $T_3$, $T_5$, and $T_7$, milliammeter will display the count in visual form. For example, when $T_1$, $T_3$ and $T_5$ are made conducting by the application of five pulses on terminal 19, milliammeter 26 will read 5 by virtue of resistance 21, 22, and 23 having a relative weight of 1, 2, and 2, respectively.

The amount of current flowing through meter 26 is a function of the conductive states of the binary halves. The combination of the binary halves conducting or nonconducting is a function of the number of pulses applied to terminal 19.

The output of the counter of this invention is directly connected to meter 26. Meter 26 may be carried by the helicopter, while the counter and the range computing equipment are in the fish 10.

The metering circuit of this invention was designed to operate with a 24 volt D.C. source, so that the cable connecting the meter 26 in the helicopter to the counter carries only D.C. current.

Further, because binary half $T_8$ provides an output when ten pulses have been inserted and then automatically recycles, another counter identical to the counter disclosed may have the input terminal thereof connected to the output of binary half $T_8$ to function as a tens counter. A third counter, of course, may be utilized as a hundreds counter.

The resistances Rc which were shown on the drawing for purposes of completeness form no part of this invention which as disclosed would function without them.

It should be understood, of course, that the foregoing disclosure relates to a preferred embodiment of the invention and that other modifications may be made therein without departing from the spirit and the scope of the invention as set forth in the appended claim.

What is claimed is:

A ranging device for navigation of an airborne vehicle, comprising, in combination:
  a milliammeter positioned in said airborne vehicle,
  a bottom contour following body submerged in the sea and suspended from said airborne vehicle,
  a pair of responders at known locations within the sea, adapted to return a constant frequency signal,
  a constant frequency signal source and receiver contained within said submerged body adapted to send to and receive back from said pair of responders a constant frequency signal,
  and a counter contained in said submerged body to detect the number of pulses between sending and receiving said signal and adapted to send to said milliammeter a current proportional to said number of pulses, said counter comprising:
    a source of D.C. voltage connected to one side of the milliammeter.

References Cited in the file of this patent

UNITED STATES PATENTS

| | | |
|---|---|---|
| 2,361,177 | Chilowsky | Oct. 24, 1944 |
| 2,433,385 | Miller | Dec. 30, 1947 |
| 2,658,139 | Abate | Nov. 3, 1953 |
| 2,709,770 | Hansen | May 31, 1955 |
| 2,852,194 | Wolfington | Sept. 6, 1958 |
| 2,860,832 | Burns | Nov. 18, 1958 |
| 2,993,202 | Halonen | July 18, 1961 |
| 3,014,211 | Bussey | Dec. 19, 1961 |
| 3,015,815 | Mann | Jan. 2, 1962 |
| 3,030,050 | Hagemann | Apr. 17, 1962 |

UNITED STATES PATENT OFFICE
CERTIFICATE OF CORRECTION

Patent No. 3,141,960                                                      July 21, 1964

David Biser

It is hereby certified that error appears in the above numbered patent requiring correction and that the said Letters Patent should read as corrected below.

Column 4, line 62, after "milliammeter" the period should be a comma and the following inserted:

> first, second, third, and fourth binaries in cascaded relationship, each of said binaries comprising a normally conducting half and a normally nonconducting half,
> means connecting said normally conducting half or said first, second and third binaries to said normally nonconducting half of said second, third, and fourth binaries, respectively,
> first feedback means connected between said normally conducting half of said third binary and said normally nonconducting half of said second binary,
> second feedback means connected between said normally conducting half of said fourth binary and said normally nonconducting half of said third binary,
> individual weighted resistor means connected between the other side of said milliammeter and each of said normally nonconducting halves whereby the current measured by said milliammeter is proportional to the combination of said normally nonconducting halves which are conducting.

Signed and sealed this 17th day of November 1964.

(SEAL)
Attest:

ERNEST W. SWIDER
Attesting Officer

EDWARD J. BRENNER
                                                              Commissioner of Patents